S. OTIS.
CAR.
APPLICATION FILED JULY 13, 1909.
1,019,911.
Patented Mar. 12, 1912.
10 SHEETS—SHEET 8.
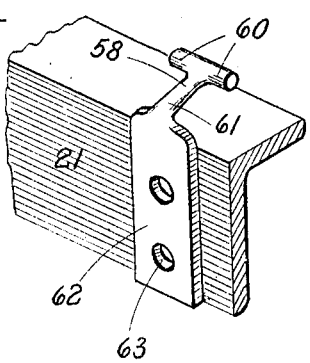
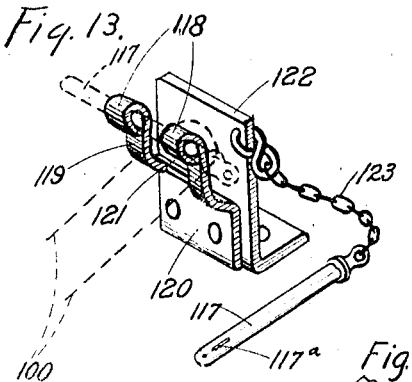
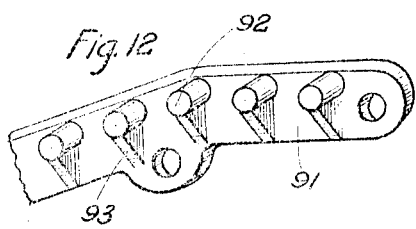
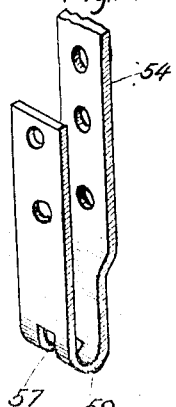
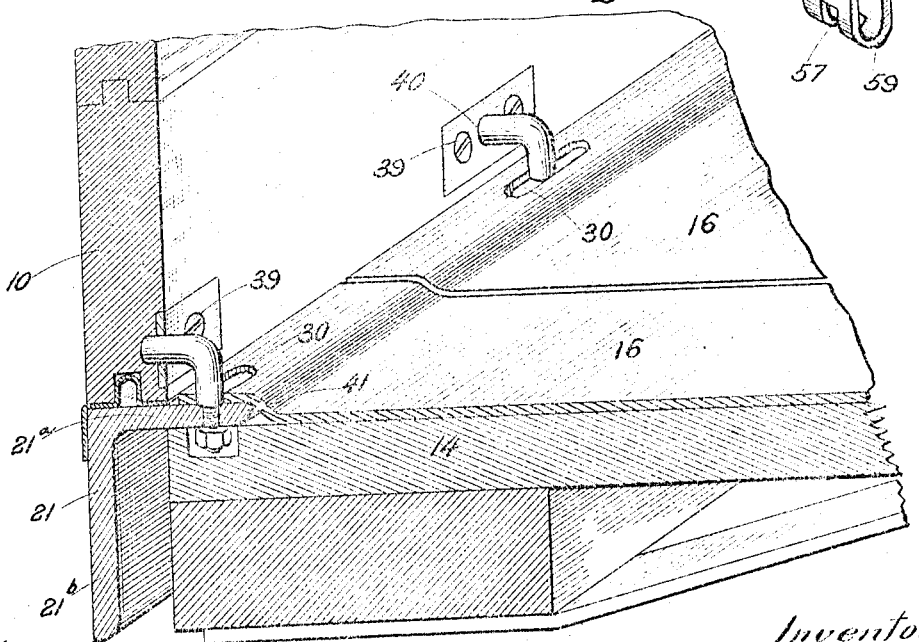
Witnesses:
Inventor:
Spencer Otis
By Sheridan, Wilkinson & Scott Attys

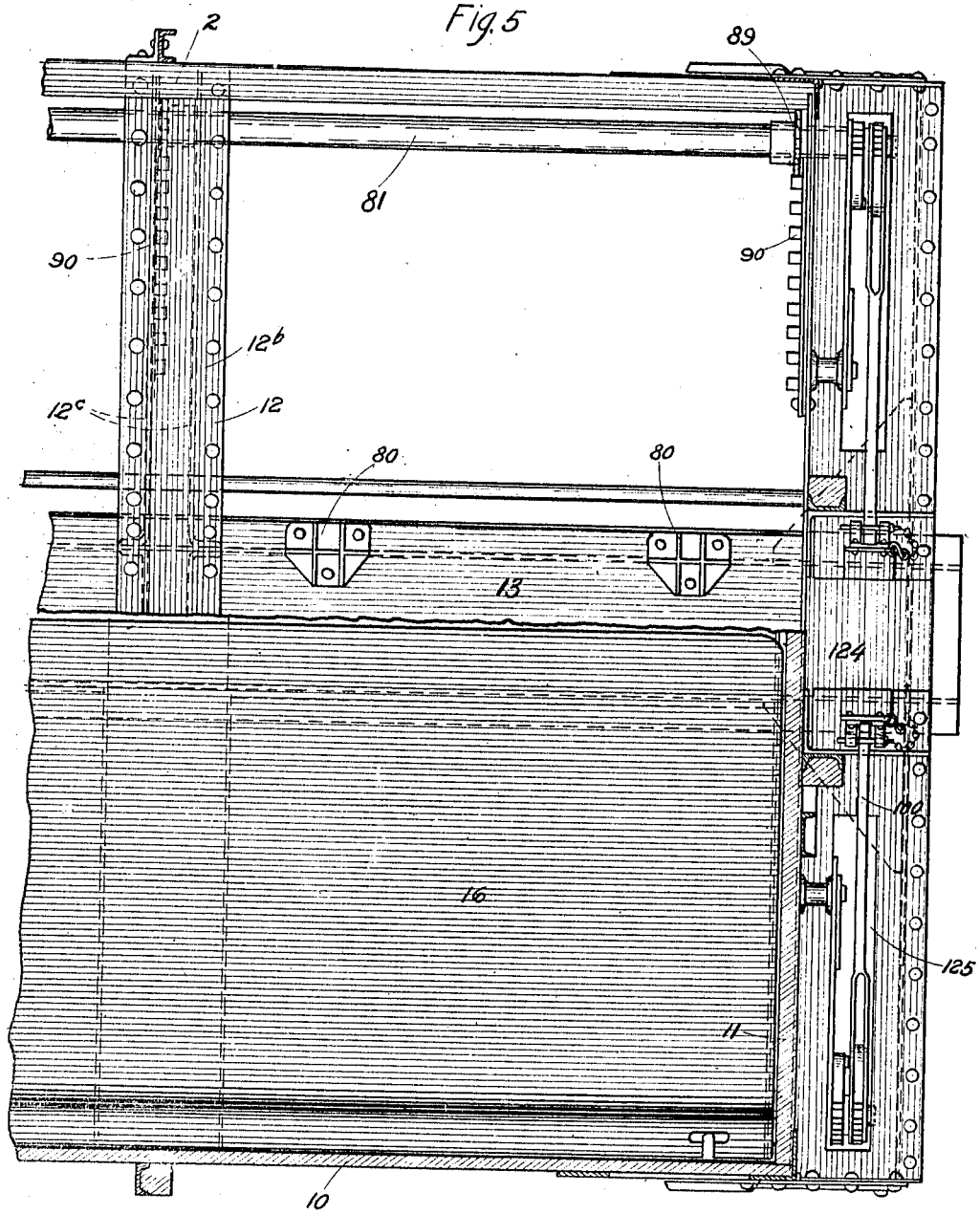

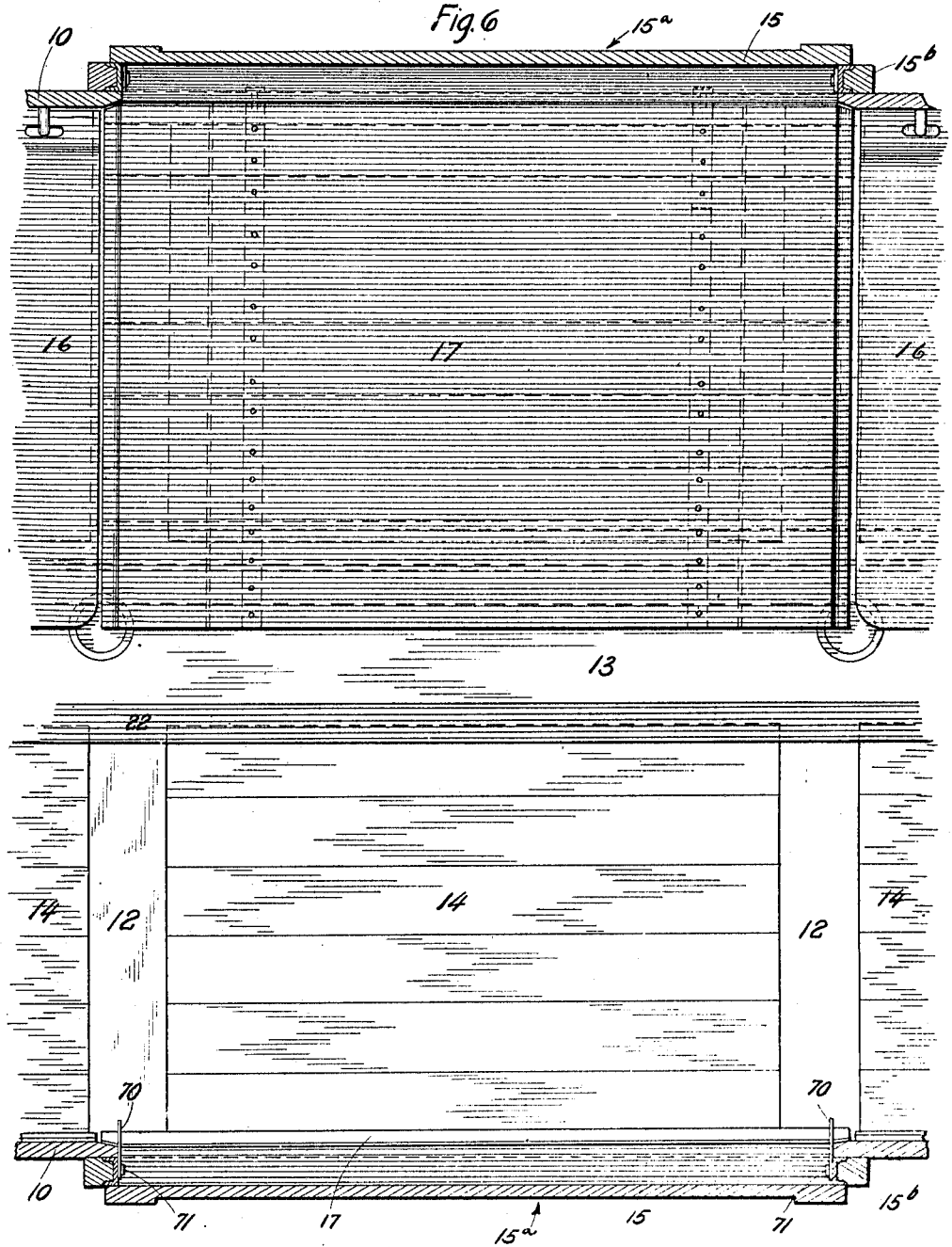

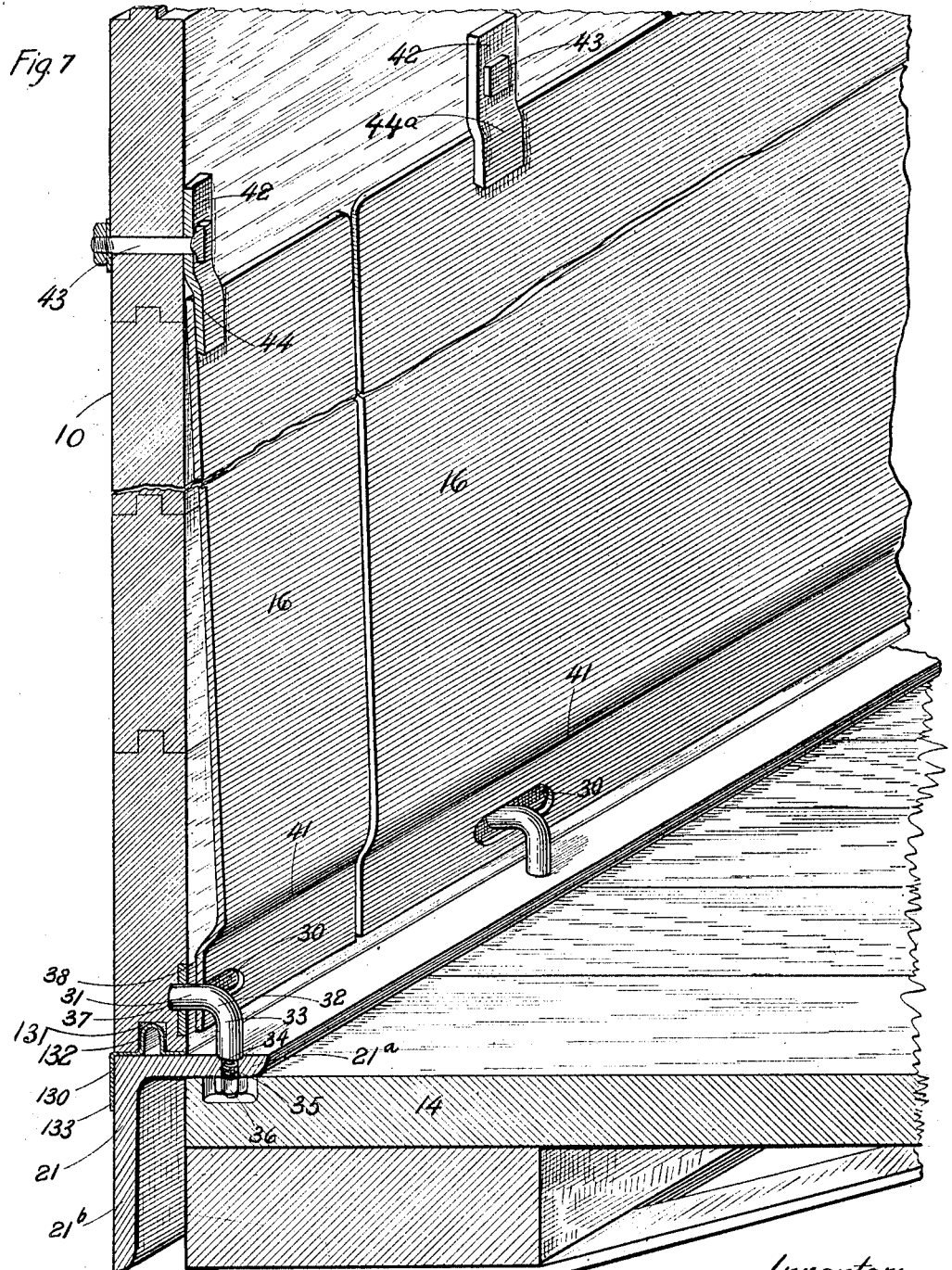

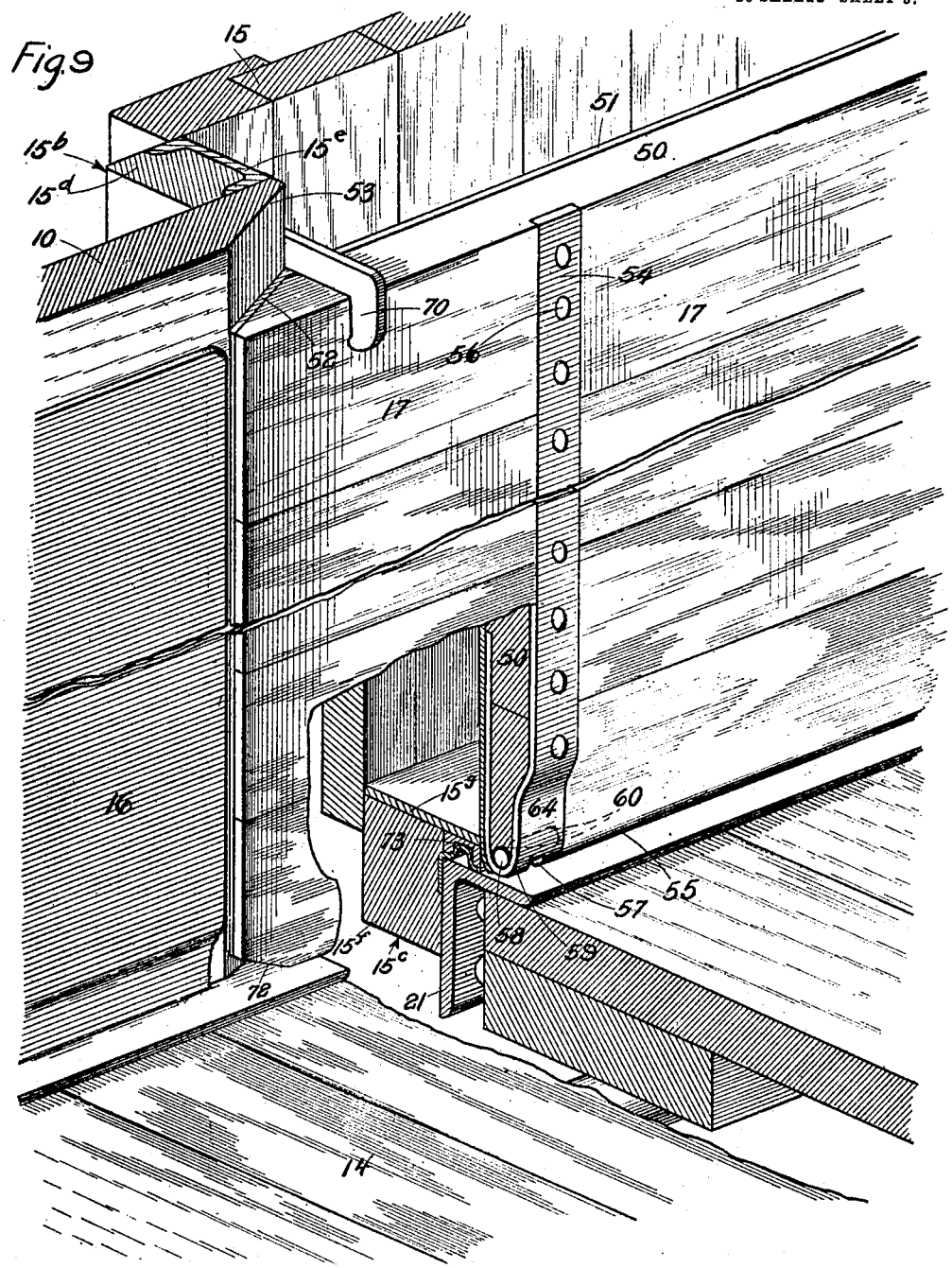

S. OTIS.
CAR.
APPLICATION FILED JULY 13, 1909.

1,019,911.

Patented Mar. 12, 1912.
10 SHEETS—SHEET 10.

UNITED STATES PATENT OFFICE.

SPENCER OTIS, OF CHICAGO, ILLINOIS, ASSIGNOR TO NATIONAL DUMP CAR COMPANY, OF CHICAGO, ILLINOIS, A CORPORATION OF MAINE.

CAR.

1,019,911.   Specification of Letters Patent.   Patented Mar. 12, 1912.

Application filed July 13, 1909. Serial No. 507,339.

*To all whom it may concern:*

Be it known that I, SPENCER OTIS, a citizen of the United States, residing at Chicago, in the county of Cook and State of Illinois, have invented certain new and useful Improvements in Cars, of which the following is a specification.

The object of my invention is to provide a car which may be used either as a box car or as a dump car.

A particular feature of my improvements lies in an auxiliary floor comprising plates or pivoted members which may be made to lie either upon the floor of the car or in a vertical position against the side walls. When lying upon the floor they cover the openings in said floor occupied by the usual drop doors. These auxiliary floor members prevent the loss of the contents of the car in case of the opening of the drop doors through accident, or through design on the part of thieves.

Another feature is to make those particular auxiliary floor members which are adjacent the side doors of the car serve as inside doors for the side door openings.

These inside doors may serve as grain doors or may be used for any purpose in which a door or closure of less than full height of the door opening is desired, or in which a closely fitting door applied to said opening from the inside is desirable.

Another object of my improvements is to provide a floor of metal which will protect the ordinary wooden construction against damage from such freight as heavy machinery, coal, etc. When in an upright position the metal plates offer a similar protection for the side walls of the car.

Another object of my invention is to improve the drop door operating mechanism, one feature of which is a lock for retaining the mechanism in a position that will hold the doors closed.

Another feature is a toothed rack which is mounted on the interior of a transverse sill and underframe and which is thereby protected by the walls of the sill.

Other objects will be made apparent in the following specification and claims, taken in connection with the accompanying drawing, in which—

Figure 1:
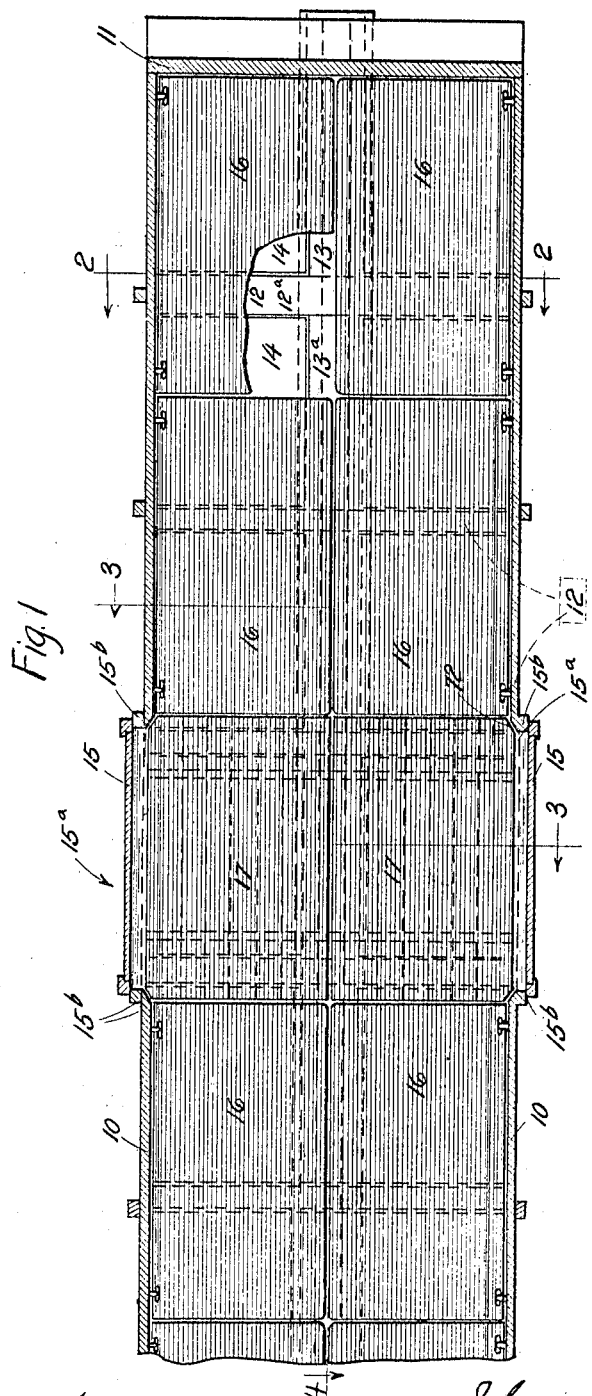
Figure 2:
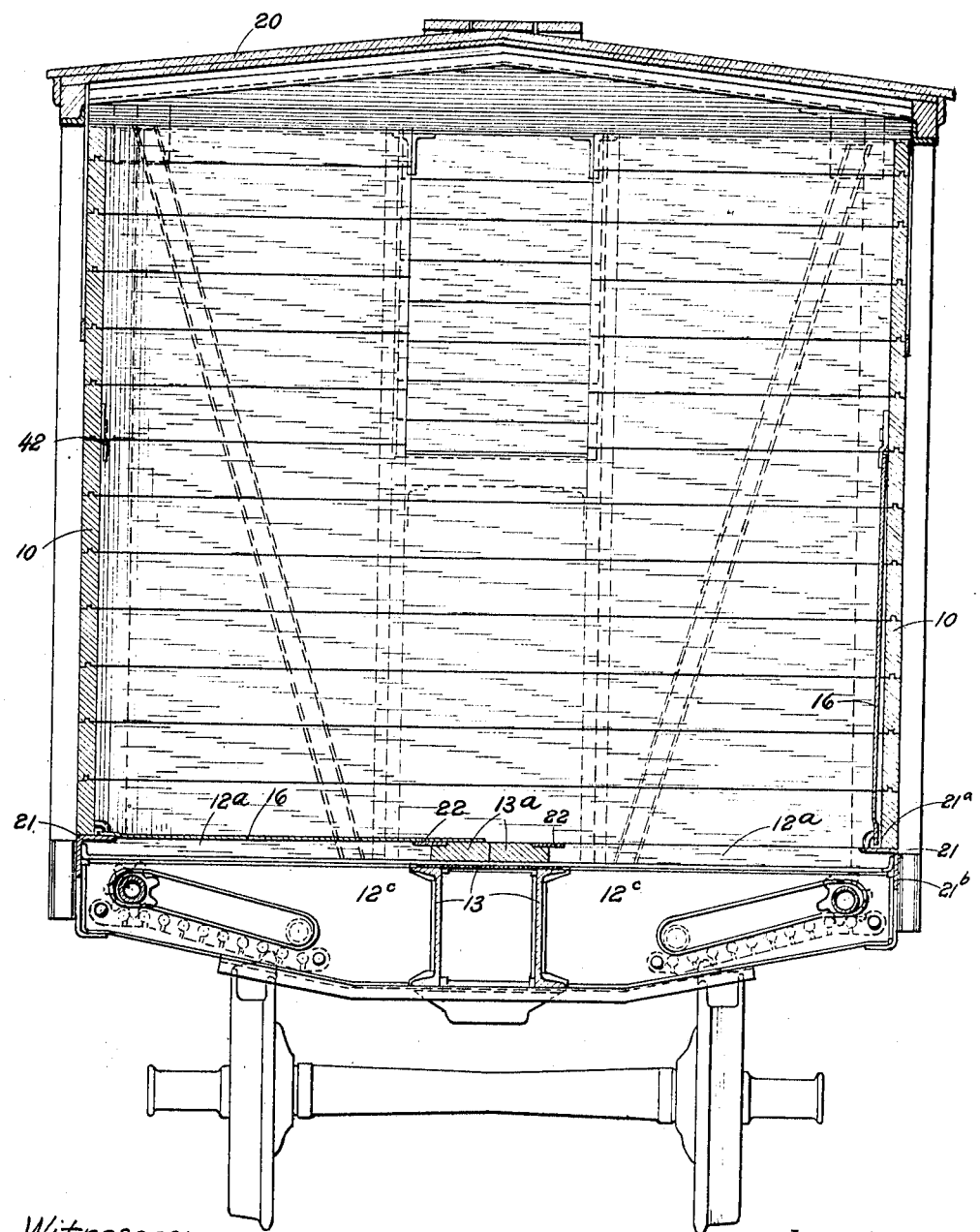
Figure 3:
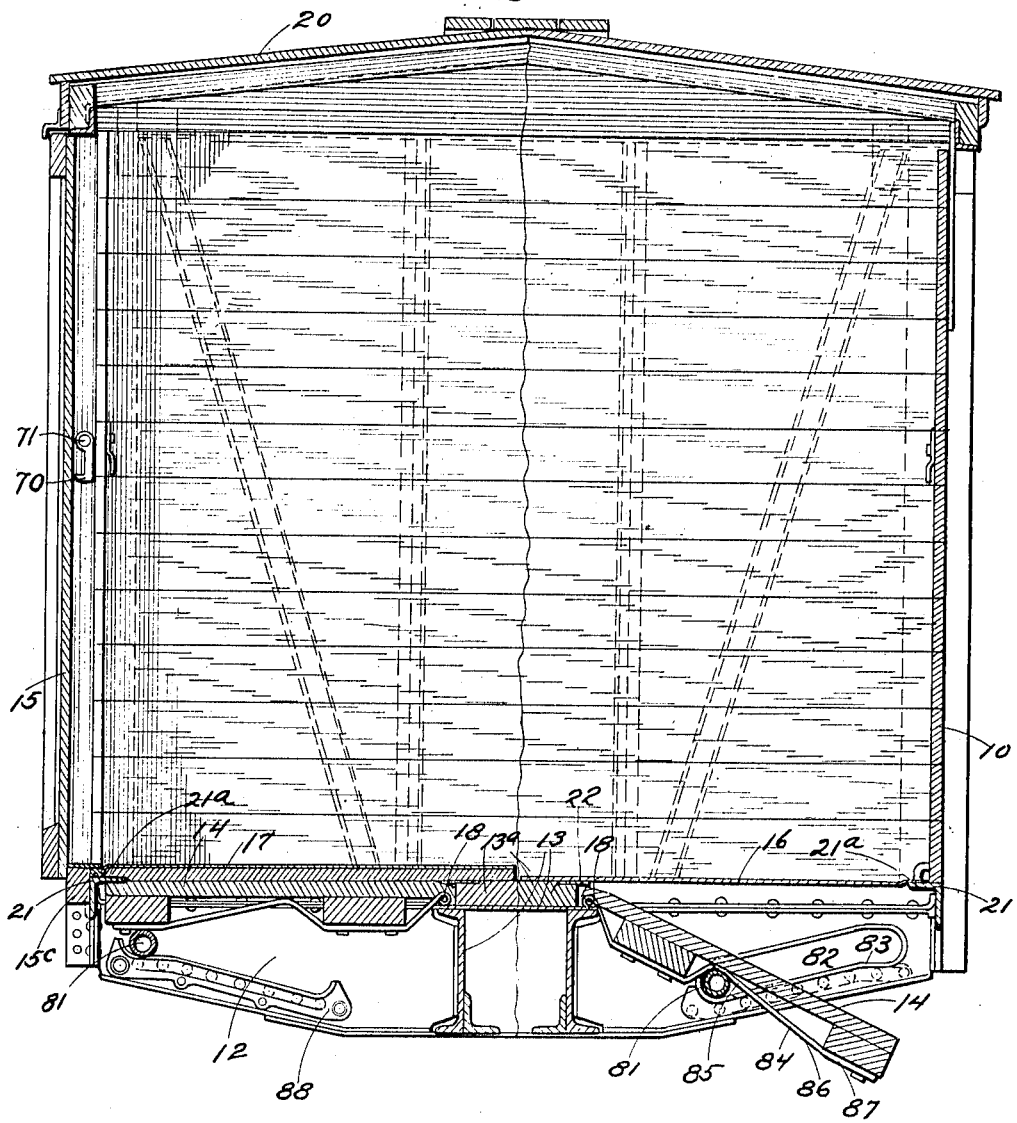
Figure 4:
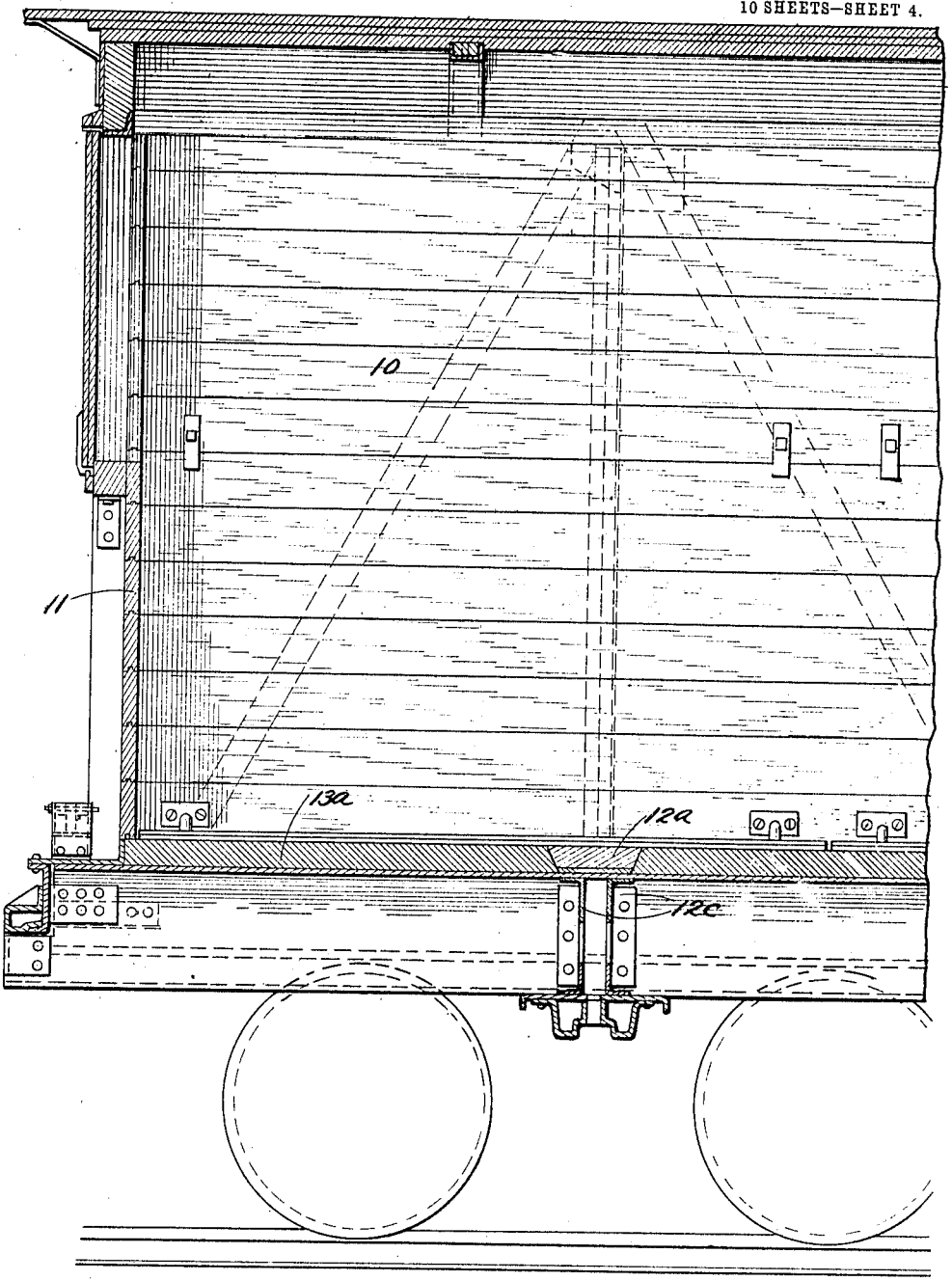
Figure 10:
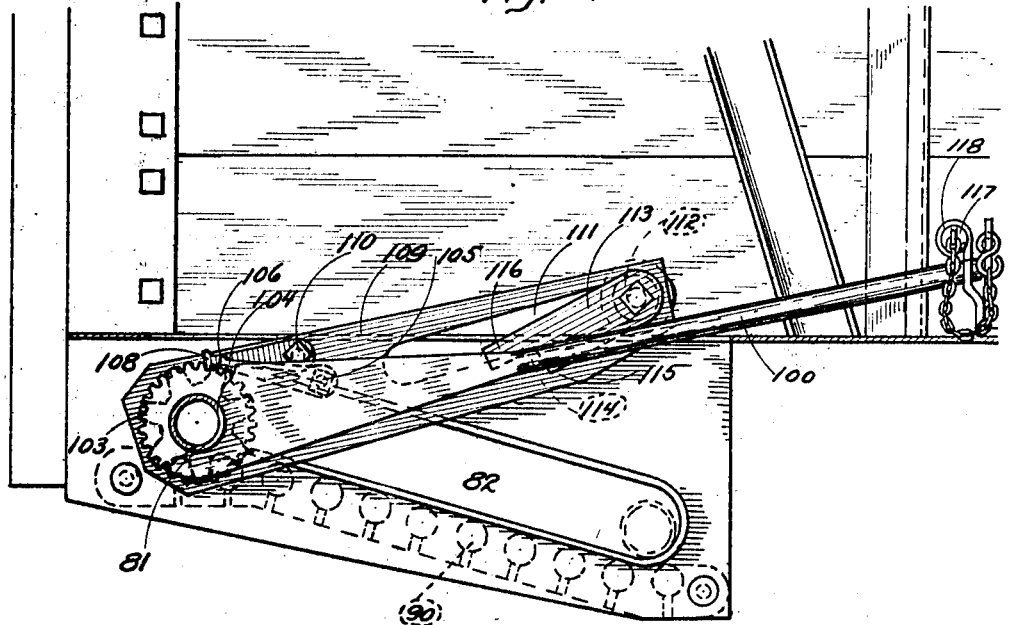
Figure 11:
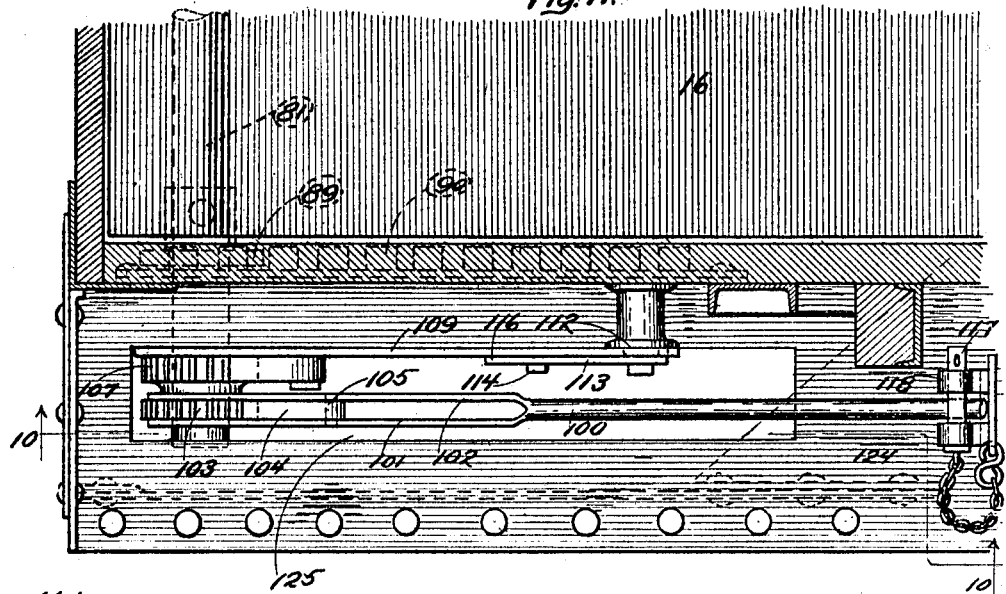

Figure 1 is a plan view showing principally the auxiliary floor members. Fig. 2 is a cross section of the car at the bolster on the line 2, 2 of Fig. 1. Fig. 3 is a cross section on the line 3, 3. Fig. 4 is a longitudinal section along the central line 4 at one end. Fig. 5 is a horizontal section with the flooring removed on one side to show the underframe. Fig. 6 is a sectional plan view on the central part of the car showing one of the floor members lying in a horizontal position and the other in a vertical position serving as an inside door. Fig. 7 is a perspective view as seen from the interior of the car showing in detail the floor plates in an upright position. Fig. 8 is a perspective view as seen from the interior of the car showing the floor plates lying in a horizontal position and showing the hinges by which the plates are attached to the floor and side walls. Fig. 9 is a perspective view as seen from the interior of the car showing one of the floor plates in an upright position and serving as an inside door. Fig. 10 is an elevation of the hand lever and drop door mechanism at the end of the car. Fig. 11 is a plan view of the same. Fig. 12 is a perspective view of a portion of one of the racks. Fig. 13 is a perspective view of the device for locking the hand lever in position. Fig. 14 is a perspective view of the strip of iron which serves as a hinge member for the inside doors. Fig. 15 is a perspective view of another member of the hinge by which it is attached to the side sill.

In the drawings, the side walls 10, the roof 20 and the end walls 11 form the main body of the box car which is supported by the underframe comprising the center sills 13, side sills 21, and the transverse sills 12. The transverse sills 12 are fixed to the center sill 13 and carry the side sills 21 at their outer extremities. Hinged to the center sill 13 are the dump doors 14 which lie between the transverse sills 12 and close upwardly against an inwardly projecting flange 21$^a$ of the side sills 21.

On the upper surface of the metal underframe are placed wooden floor pieces 13$^a$ and 12$^a$. The dump doors 14 when closed are flush with the floor pieces 13$^a$ and 12$^a$. The side sill 21 is an angle bar having one leg 21$^a$ horizontally disposed and the other leg 21$^b$ vertically disposed and flush with the outer surface of the wall 10 of the car body. The narrow longitudinally disposed plates 22 are attached to wooden floor pieces 13ᵃ and project beyond their edges sufficiently to serve as covers for the openings occurring at the hinged edges of the dump doors when the latter are lowered. The auxiliary floor members 16 and 17 are provided for the purpose of covering the dump door openings when the car is used for the general purpose of a box car and when the dump doors 14 are not in use. When the said dump doors are not in use there is always the possibility of their being accidentally or designedly opened, and then the auxiliary floor members 16 and 17 very effectively prevent loss of the contents of the car.

The auxiliary floor members 16 are preferably single steel plates pivoted to the side sills 21. Their dimensions are such as will permit them to reach from the side walls to the center of the car and which will permit four of them to be placed in the end portion of the car between the end wall and the side doors.

The auxiliary floor members 16 are provided with elongated apertures or slots 30 by which they are loosely pivoted at their outer edges to the hook bolts 31. These hook bolts 31 are given a right angular bend at 32 and a shank or body portion 33 is provided with the shoulder 34 and the threaded portion 35 by which it is attached to the horizontally disposed member 21ᵃ of the angle bar 21. The nut 36 serves as a locking nut. The end 37 of the hook 31 is let into the socket in the side walls 10. The metal plate 38 serves as a reinforcement for holding the said end 37 secure. The plate 38 is held rigidly in place by two screws 39. The bend 32 is given an easy curve for permitting the slotted aperture 30 in the plates 16 to be easily moved from the vertical part 33 to the horizontal part 37 of the bolt.

The plate 16 is preferably given an offset 41 to allow it to lie snugly on the upper surface of the dump doors 14. This offset is of course equal to the thickness of the horizontally disposed leg 21ᵃ of the angle bar 21. The plates 16 are held in an upright position against the side walls by buttons or rotatable pieces 44, which are pivoted on the bolts 43 passing through the side walls 10. These clamps 42 have offset portions 44ᵃ which are designed to lap over the edge of the plate when swung around to their holding position.

The length of the vertical part 33 of the bolt 31, as well as the horizontal part 37, gives great freedom of movement to the plate. This allows for the presence of small fragments of coal, stone or other materials on the floor or in the corners without binding or without interference with the proper performance of the function of the auxiliary floor members 16. The elongated apertures 30 also allow considerable end movement of the plates 16 for a similar purpose.

The auxiliary floor members 17 which occur at the middle of the length of the car are constructed somewhat differently from the plates which have been described above. The members 17 are designed to serve the combined purpose of a floor member and an inside door. These floor members 17 when in an upright position lie across the lower portion of the side door openings 15ᵃ. The location of these members is shown in Fig. 1 where they are seen lying upon the floor of the car. Their dimensions are not greatly different from those of the plates 16. In Fig. 6 the central part of the car is shown on a much larger scale. In this figure one of the floor members 17 is shown lying upon the floor of the car while the other is standing in an upright position as it will appear when serving as an inside door. In Fig. 9 the details of the construction of the middle floor members 17 and their hinged and related parts are fully shown. At the middle of the length of the side walls 10 are the door openings 15ᵃ and outside doors 15 as commonly found in box cars. The door posts 15ᵇ comprise an outer main body of wood 15ᵈ and an interior metal portion 15ᵉ. This inner piece 15ᵉ preferably consists of an ordinary channel bar in which the wooden body portion 15ᵈ is fixed. The door posts as a whole space the outer door 15 from the side walls 10, and also serve the purpose of a door frame.

The door sill 15ᶜ comprises the wooden portion 15ᶠ and the metal plate 15ᵍ on the top surface thereof. The side door sill 15ᶜ complete is attached to the side sill 21 of the car frame. The hinged member 17 is provided with a body portion 50 made of wood of considerable thickness and of a plate 51 which forms its upper surface when it lies in a horizontal position on the floor of the car. When in a vertical position and acting as an inside door the metal plate 51 is on the outer surface. The ends of the members 17 are beveled as shown at 52, and the wall is similarly beveled at 53 to permit the members to fit snugly within the door opening. The interior surface of the member 17 when serving as a side door is then substantially flush with that of the other auxiliary floor members 16 when the latter are in an upright position. By means of the beveled edges 52 when the member 17 is in a horizontal position, the passage of wheelbarrows, etc., from the main floor of the car on to the metal surface 51 is made easy when loading or unloading the car by hand. The flat metal strip 54 is let into the wooden body 50 and is carried around a lower or hinged edge 55 and under the plate 51 to a distance sufficient to make a strong connection. The rivets 56 serve to bind the parts together. The strip 54 is provided with a notch or opening 57 to permit the insertion of a hinged member 58 which is attached to the angle bar 21 or side sill. The looped end 59 of the strip 54 embraces the two lateral projections 60 of the hinged member 58. The stem or shank 61 (see Fig. 15) joins the flat portion 62 by which attachment is made to the angle bar 21 by means of the rivets or bolts in the holes 63. The strip 54, as well as the wooden backing 50, is offset at 64 which permits it to lie snugly over the angle bar 21 and upon the floor of the car.

The members 17 are retained in their vertical position by hooks 70 which are pivoted on pins or bolts 71 fixed to the door posts 15$^b$. The lower corners 72 of the members 17 are beveled to prevent interference with the beveled edges 53 of the wall boards and to match the same and make a continuous floor surface when the members 17 are lowered. The door sill plate 15$^g$ is elevated a sufficient distance to bring its upper surface flush with the surface of the members 17 when the latter are lowered. The filling piece 73 supports the edge of the plate 15$^g$ and prevents accumulation of material under it.

The dump doors 14 are hinged to the center sill 13 by means of the hinge pins 18 and brackets 80. The dump doors 14 are raised to their closed positions by the movement of the shaft 81, which in the present invention is preferably a rotatable hollow shaft. This hollow shaft is equal in length to about half the length of the car body and there would be four of these shafts 81 in each car. The shafts 81 pass through inclined elongated apertures 82 in the transverse sills 12, said apertures having a horizontal portion 83 at their upper or outer ends.

The dump doors 14 are provided on their lower sides with the bars 84 which are bent to such form as will enable the shaft 81 to operate the doors in the desired manner. The depression 85 in the bar 84 permits a wider range of opening of the door than would be effected if the bar 84 were straight. The inclined portion 86 culminating in the parallel portion 87 produces a quick closing effect with a small rise of the shaft 81. The portion 87 lies in a horizontal position when the door is closed and the shaft 81 then has no tendency to slide from under it and permit the door to drop. In the same manner the horizontal portion 83 of the elongated opening 82 supports the shaft 81 without any tendency existing thereon to cause it to slide from its position.

At the end of the shaft 81 at the middle of the car the opening 82 in transverse sill 12 is omitted and the end of the shaft 81 can be supported at this point by the flanged supporting piece 88 which is riveted to said transverse sill 12.

The shaft 81 is provided with pinions 89 which mesh with toothed racks 90 fixed to the transverse sills 12. They are fixed in proper relation to the apertures 82 to permit meshing of the pinions 89 therewith, while the shaft 81 travels along said apertures.

A portion of one of the racks is shown in Fig. 12. The body 91 of the rack is bolted to the web of the transverse sill. The teeth 92 are preferably of circular form projecting laterally from the body 91 and are strengthened by the ribs 93. In those transverse sills 12$^b$ of the car which perform the functions of bolsters and in which there are two webs 12$^c$, Figs. 4 and 5, the racks are attached to the inner faces of said webs. The rotation of the shafts 81 will cause them to move by virtue of the rack and pinion connection in a manner which will either close the dump doors or permit them to open, depending upon the direction of rotation.

The hand lever 100 is loosely or rotatably mounted upon the shaft 81 at a point outside the end walls of the car body. The hand lever is forked or divided into two flat portions 101, 102 at its pivotal connection with the shaft 81 and for approximately half the length of the lever. Between the divided parts 101 and 102 and fixed to the shaft 81 is the toothed wheel 103. The pawl 104 is pivoted to the lever by pin 105. The pawl 104 is placed between the divided parts 101 and 102 of the lever. The end 106 of the pawl is provided with oppositely disposed teeth for engagement with the toothed wheel 103 on either side of the lever 100. The lever 100 may by this means be made to rotate the shaft 81 in either direction. In the position of the pawl 104 shown in Fig. 10, the shaft 81 would be rotated to the left if the lever 100 were given an oscillatory movement. The oppositely disposed teeth 106 are so formed as to slip over the teeth of the wheel 103 when moved in one direction but to engage them when moved in the other direction. Adjacent said toothed wheel 103 on the shaft 81 is fixed another toothed wheel 107 which may be called a detent wheel. The detent 108 pivoted upon the floating member 109 at 110 is made to engage said wheel 107. The member 109 is preferably made of a steel plate pivoted upon the shaft 81 adjacent the wheel 107. This plate 109 is given a form somewhat similar to that of a lever, one end of which is pivoted to said shaft 81. The opposite end of the member 109 is provided with an elongated opening 111 which is adapted to encompass and slide upon a pin or stud 112 fixed upon the car body. The member 109 is thus permitted to accommodate its position to the movable shaft 81 as the latter moves outwardly and inwardly in the guide openings 82 in the transverse sills. While thus moving on the shaft 81, it has a limited rotation or oscillatory motion about the shaft 81, but this movement is not of sufficient extent to prevent it serving as a support for a detent 108.

It is desirable to lock the shaft 81 in its outermost position in which the dump doors 14 are held closed. For this purpose a pawl 113 is pivoted upon the stud 112 outside of the member 109 but adjacent thereto, which is adapted to engage a lug or projecting pin or part 114 upon the member 109. The pawl or locking device 113 will drop by gravity behind said lug 114 when the shaft 81 has reached its outermost position. The shoulder 115 will bear against the lug 114 and prevent any movement of the member 109 to the right. The finger 116 rests upon the top of the lug 114 and prevents the pawl from dropping below said lug.

The hand lever 100 is held in its position of rest by a pin 117 carried by eyes 118 formed of the tongues 119 on the notched and formed plates 120. The notch 121 in said plate 120 is adapted to receive the end of the lever 100.

The pin 117 lying in the loops above the end of the lever 100 prevents the accidental raising of said lever. The pin is attached to the angle piece 122 by the chain 123 to prevent its loss when removed from the loops 118. The plate 120 is riveted to the angle piece 122 and the latter is fixed to the upper surface of the end sill 124. The end sill 124 is recessed at 125 for the accommodation of the hand lever 100 and associated mechanism. The slot 117ª permits the attachment of a seal to prevent removal of the pin 117 and the operation of the dump doors.

In order to prevent entrance of water at the base of the side walls, the galvanized iron flashing 130 is provided. The groove 131 in the lower edge of the lowest board of the side wall is used for the insertion of a rib or bead 132 formed in the galvanized iron strip of which the said flashing is made. A downwardly projecting flange 133 is provided, and the angle that is formed by said flange with the main body of the flashing is made to lie upon the corner of the angle bar 21. The water would have to flow upwardly in order to pass over the rib 132, to reach the interior of the car and by this means its entrance is effectively prevented.

I claim—

1. In a car of the character described, a transverse sill of hollow form, a rack mounted in the interior thereof, and a drop door operating mechanism comprising a pinion engaging said rack.

2. In a car of the character described, transverse hollow sills provided with double vertical webs, a rack mounted on the interior face of one of said webs, drop doors adjacent said sills, and operating mechanism comprising a pinion engaging said rack.

3. In a car of the character described, a transverse hollow sill provided with double vertical webs, a rack mounted on the interior face of one of said webs, drop doors adjacent to said transverse sill, a movable shaft beneath said doors, a pinion on said movable shaft meshing with said racks and operating mechanism connected with said movable shaft.

4. In a car of the character described, a side wall having a door opening with beveled edges, a door for said opening having beveled edges to match said door opening and comprising a metal plate provided with a wood backing, said door being pivoted to the base of the side wall and adapted to swing to a horizontal position to serve as an auxiliary floor member, in which position the said beveled edge acts as a connecting strip between the upper level of said door member and the main floor of said car.

5. In a car of the character described, a side wall supported by a side sill comprising an angle bar, said angle bar having its horizontal leg inwardly directed, and a water-tight joint construction comprising a metal reinforcing strip having a downwardly depending flange on its outer side, said flange fitting over said angle bar, said reinforcing strip having an upwardly extending rib, said rib being covered by a grooved wooden strip, the groove of which registers with the rib of said reinforcing strip.

6. In a car of the character described, a side wall supported by a side sill comprising an angle bar, a floor having door openings, an auxiliary floor member pivoted to said angle bar, said floor member comprising a metal plate with a wood backing and adapted to cover said door openings and also adapted to swing to a vertical position against the side wall and across a door opening in said side wall, said floor member being constructed with beveled edges adapted to match beveled edges of said side wall opening, and means for retaining said member in position against said wall.

7. In a car of the character described, a side wall supported by a side sill comprising an angle bar, a center sill, transverse sills joining the side and center sills, and a floor member hinged to said angle bar, said floor member comprising a metal plate with a wood backing and adapted to lie on the transverse sills and also to lie against the side wall across the door opening in said side wall, said floor member being constructed with beveled edges to match beveled edges of the side wall opening.

8. In a car of the character described, a side wall supported by a side sill comprising an angle bar having a leg projecting inwardly beyond the inner surface of the side wall, a hooked bolt attached to said angle bar leg, and an auxiliary floor member pivotally attached to said hooked bolt by means of an elongated aperture in said member encompassing said bolt.

9. In a car of the character described, a side wall supported by a side sill comprising an angle bar having a leg projecting inwardly beyond the inner surface of the side wall, a hooked bolt attached to said angle bar leg, and an auxiliary floor member pivotally attached to said hooked bolt by means of an elongated aperture in said member encompassing said bolt, said floor member being offset at its pivoted side, whereby said floor member may rest securely on the floor of the car.

10. In a car of the character described, a side wall supported by an angle bar, said angle bar having a horizontal leg projecting inwardly beyond the inner surface of the side wall, auxiliary floor members pivotally connected at one edge to said side wall, said floor members being offset near their pivotally connected edge to clear the projecting part of said angle bar.

11. In a car of the character described, a side wall supported by a side sill comprising an angle bar having a leg projecting inwardly beyond the inner surface of the side wall, hooked bolts attached to said angle bar leg, and auxiliary floor members pivotally attached to said hooked bolts.

12. In a car of the character described, a side wall supported by a side sill comprising an angle bar having a leg projecting beyond the inner surface of the side wall, transverse sills and a center sill, doors hinged to said center sill and auxiliary floor members hinged to the inwardly projecting leg of said angle bar.

13. In a car of the character described, a side wall supported by a side sill comprising an angle bar having a leg projecting inwardly beyond the inner surface of the side wall, and hooked bolts each having one end projecting through and below said angle bar leg, said ends being threaded and fastened on the under side of said angle bar leg, the opposite ends of said bolts being seated in metal socket members embedded in the side wall of the car.

In testimony whereof, I have subscribed my name.

SPENCER OTIS.

Witnesses.
   Geo. L. Wilkinson,
   Walter A. Scott.